J. F. HARTWIG.
FASTENER.
APPLICATION FILED APR. 27, 1917.

1,256,311.

Patented Feb. 12, 1918.

WITNESSES
RE Rousseau
L. C. Wilcox

INVENTOR
J. F. Hartwig,
BY Victor J. Evans,
ATTORNEY

UNITED STATES PATENT OFFICE.

JOHN FREDRICK HARTWIG, OF CORTLAND, NEW YORK.

FASTENER.

1,256,311. Specification of Letters Patent. Patented Feb. 12, 1918.

Application filed April 27, 1917. Serial No. 164,932.

*To all whom it may concern:*

Be it known that I, JOHN FREDRICK HARTWIG, a citizen of the United States, residing at Cortland, in the county of Cortland and State of New York, have invented new and useful Improvements in Fasteners, of which the following is a specification.

This invention relates to fastening devices especially adapted to be used upon hollow tubing and the like and it consists in the novel features hereinafter described and claimed.

An object of the invention is to provide a fastening device of simple and durable structure which may be easily and conveniently used for effectually securing a cloth, fabric or similar material in position upon a hollow tubing as for instance the bow of the top of an automobile or similar machine.

With this object in view the fastener comprises two members, one of which is provided at one end with an outstanding annular flange and at its opposite sides with openings. A second member is provided with a split shank which is adapted to be driven into the first mentioned member and which is intended to penetrate the material which is secured in position upon the tubing or bow. The second mentioned member is provided with a head which is adapted to lie against the said material and when the head of the second mentioned member is struck with a hammer or other implement the side portions of the shank of the said second member are spread into the openings at the sides of the first mentioned member and consequently the said members are secured together and the cloth or other material is held in position upon the bow or tubing.

In the accompanying drawing:—

Figure 1:
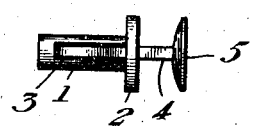
Figure 1 is a side elevation of the fastener.
Figure 2:
Fig. 2 is a top view of the same.
Figure 3:
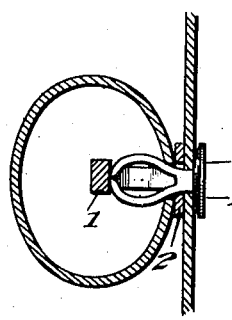
Fig. 3 is a sectional view of the fastener showing the same applied.
Figure 4:
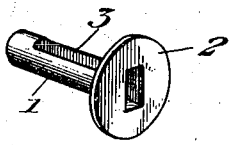
Fig. 4 is a perspective view of one member of the fastener.
Figure 5:
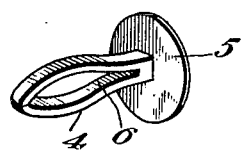
Fig. 5 is a similar view of the other member of the fastener.

The fastener comprises a member 1 which is provided at one end with an outstanding annular flange 2. The body portion of the member 1 is substantially cylindrical and is provided at its opposite sides with elongated slots or openings 3. That end of the member 1 which is opposite the end at which the flange 2 is located is closed.

The fastener also includes a member 4 which is provided at one end with a head 5. The shank of the member 4 is split longitudinally as at 6 and the opposite side portions of the said member are bowed outwardly slightly with relation to each other.

When the fastener is used a hole is drilled in the side of the pipe or tubing to which the fastener is to be applied and the body portion of the member 1 is inserted in the said hole. The material which is to be secured is then laid over the flange 2 of the member 1. The shank of the member 4 is then passed through the said material and is inserted in the body portion of the member 1. When the end of the shank comes in contact with the lower or inner closed end of the member 1, the head 5 of the member 4 is struck with a hammer or other implement whereby the opposite side portions of the shank of the member 4 are spread and caused to enter the openings 3 of the member 1. Thus the material is secured in position upon the fastening device and inasmuch as the parts of the outer surfaces of the opposite side portions of the shank of the member 4 will project beyond the outer edges of the openings 3, the said projecting parts will bind against the edge of the opening in the pipe or bow and thus prevent the securing device from becoming detached from the same.

From the foregoing description taken in conjunction with the accompanying drawing, it will be seen that a fastening device of simple and durable structure is provided and that the same may be easily and quickly used for effectually securing a cloth or fabric in position upon a pipe or tubing which may be of metal or other similar material.

Having described the invention what is claimed is:—

A fastener comprising a member having a substantially cylindrical body portion and provided at one end with an outstanding flange and having openings located at its opposite sides, that end of the said member which is opposite the end at which the flange is located being closed, a second member having at one end a head and having a shank which is split longitudinally, the intermediate parts of the opposite side portions of the said shank being outwardly bowed with relation to each other and their free ends being in contact, the shank of the said second mentioned member adapted to enter the body portion of the first mentioned member whereby the side portions of the shank may be spread into the openings at the side of the first mentioned member by having their ends forced against the said closed end of the first mentioned member.

In testimony whereof I affix my signature.

JOHN FREDRICK HARTWIG.